US008953883B2

(12) United States Patent
Obara

(10) Patent No.: US 8,953,883 B2
(45) Date of Patent: Feb. 10, 2015

(54) IMAGE PROCESSING APPARATUS, IMAGE PROCESSING METHOD, AND COMPUTER-READABLE MEDIUM

(71) Applicant: Eiki Obara, Hiki-gun (JP)

(72) Inventor: Eiki Obara, Hiki-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 158 days.

(21) Appl. No.: 13/682,301

(22) Filed: Nov. 20, 2012

(65) Prior Publication Data
US 2013/0223738 A1 Aug. 29, 2013

(30) Foreign Application Priority Data

Feb. 29, 2012 (JP) .................................. 2012-044507

(51) Int. Cl.
*G06K 9/00* (2006.01)
*G06K 9/46* (2006.01)
(Continued)

(52) U.S. Cl.
CPC ................ *G06K 9/46* (2013.01); *G06K 9/4652* (2013.01); *G06K 9/00281* (2013.01); *G06T 5/20* (2013.01); *G06T 5/003* (2013.01); *G06T 2207/10024* (2013.01); *G06T 2207/20012* (2013.01); *G06T 2207/20021* (2013.01); *G06T 2207/20192* (2013.01); *G06T 2207/30201* (2013.01)
USPC ....................................................... 382/170

(58) Field of Classification Search
CPC ....... G06K 9/228; G06K 9/234; G06K 9/248; G06K 9/261; G06K 9/268; G06K 9/288; G06K 9/00335; G06K 9/00362; G06K 9/00375; G06K 9/00711; G06K 9/00751; G06K 9/4652; G06K 9/6226; G06T 7/0081; G06T 7/2006; G06T 7/2046; G06T 7/204; G06T 7/208; G06T 7/408; G06T 13/205; G06T 13/40; G06F 17/30793; G06F 17/30802; G06F 17/30811; H04N 1/00132; H04N 1/00167; H04N 1/56; H04N 5/147; H04N 7/26276; H04N 9/643; H04N 9/646; H04N 19/0026; H04N 19/00387; H04N 21/23418; H04N 21/4828; H04N 21/8549
See application file for complete search history.

(56) References Cited

U.S. PATENT DOCUMENTS 6,088,137 A * 7/2000 Tomizawa ...................... 358/538
6,404,900 B1 * 6/2002 Qian et al. ..................... 382/103
6,782,049 B1 * 8/2004 Dufaux et al. ............ 375/240.01
(Continued)

FOREIGN PATENT DOCUMENTS

JP 06-253265 9/1994
JP H 09233423 9/1997
(Continued)

OTHER PUBLICATIONS

Japanese Patent Application No. 2012-044507, First Office Action, mailed Jan. 29, 2013, (with English Translation).

*Primary Examiner* — Jose Couso
(74) *Attorney, Agent, or Firm* — Blakely, Sokoloff, Taylor & Zafman LLP

(57) ABSTRACT

According to one embodiment, an image processing apparatus includes a detail extraction module, a detail addition control module, and a detail component addition module. The detail extraction module extracts a detail component from an image signal of one frame. The detail addition control module controls an addition quantity of a detail component. The detail component addition module adds a detail component controlled by the detail addition control module to the image signal.

20 Claims, 6 Drawing Sheets

(51) Int. Cl.
  *G06T 5/20* (2006.01)
  *G06T 5/00* (2006.01)

(56) References Cited

U.S. PATENT DOCUMENTS

| | | | |
|---|---|---|---|
| 6,792,135 B1 * | 9/2004 | Toyama | 382/118 |
| 7,409,091 B2 * | 8/2008 | Sung et al. | 382/191 |
| 7,433,495 B2 * | 10/2008 | Rui et al. | 382/103 |
| 7,869,631 B2 * | 1/2011 | Xu et al. | 382/118 |
| 8,218,831 B2 * | 7/2012 | Tian et al. | 382/118 |
| 8,280,158 B2 * | 10/2012 | Adcock et al. | 382/165 |
| 8,295,557 B2 * | 10/2012 | Wang et al. | 382/118 |
| 8,316,301 B2 * | 11/2012 | Kim et al. | 715/723 |

FOREIGN PATENT DOCUMENTS

| | | |
|---|---|---|
| JP | H 11196317 | 7/1999 |
| JP | 2002150440 | 5/2002 |
| JP | 2006-121416 | 5/2006 |
| JP | 2006-166337 | 6/2006 |
| JP | 2008021163 | 1/2008 |
| JP | 2009245363 | 10/2009 |

\* cited by examiner

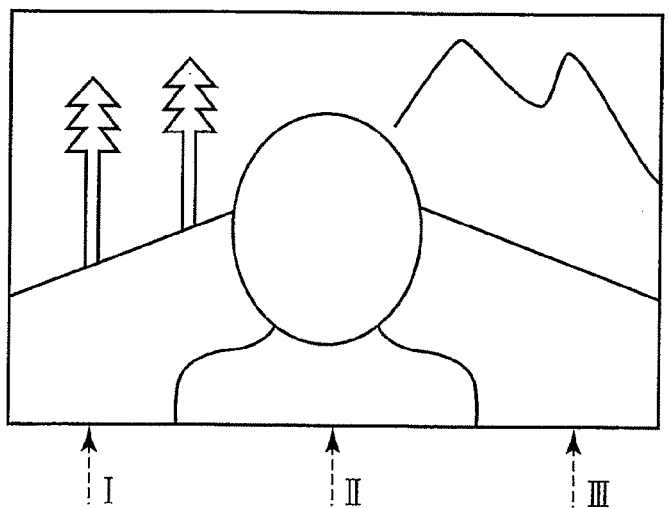
F I G. 6A
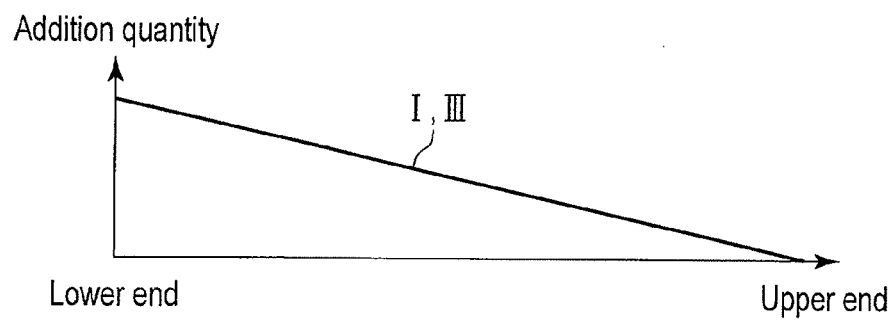
F I G. 6B
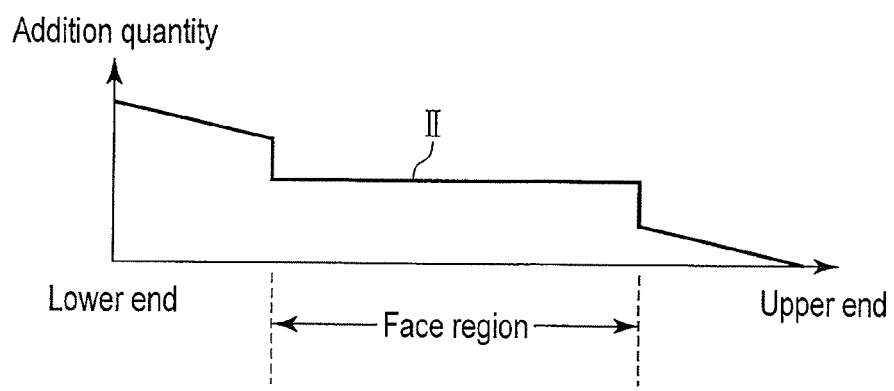
F I G. 6C

IMAGE PROCESSING APPARATUS, IMAGE PROCESSING METHOD, AND COMPUTER-READABLE MEDIUM

CROSS-REFERENCE TO RELATED APPLICATIONS

This application is based upon and claims the benefit of priority from Japanese Patent Application No. 2012-044507, filed Feb. 29, 2012, the entire contents of which are incorporated herein by reference.

FIELD

Embodiments described herein relate generally to an image processing apparatus, an image processing method, and a computer-readable medium, which process image information.

BACKGROUND

Various image processing methods which provide images with depth have been researched. As an example, developed is a method which provides images with solidity, by using blur of images and changing a blurring quantity in accordance with the distance.

Since image processing apparatuses use blur of images, and thus detail components of original images such as roughness are lost.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIGS. 6A, 6B, and 6C are exemplary diagrams illustrating operation of detail addition according to the embodiment.

DETAILED DESCRIPTION

Various embodiments will be described hereinafter with reference to the accompanying drawings.

In general, according to one embodiment, an image processing apparatus includes a detail extraction module, a detail addition control module, and a detail component addition module. The detail extraction module extracts a detail component from an image signal of one frame. The detail addition control module controls an addition quantity of a detail component. The detail component addition module adds a detail component controlled by the detail addition control module to the image signal.

Figure 1:
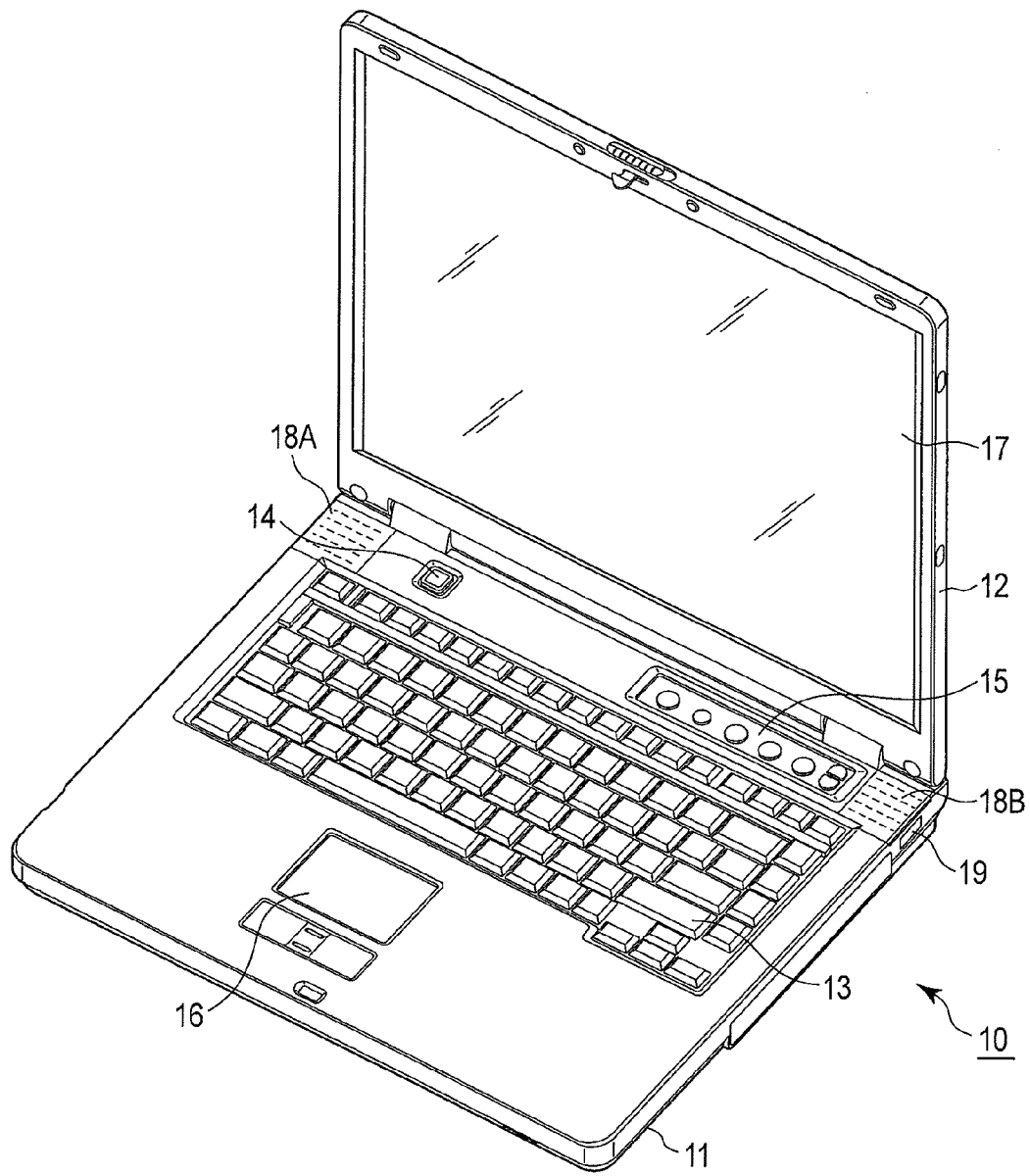
FIG. 1 is an exemplary perspective view of an appearance of an example of an image processing apparatus according to an embodiment.

FIG. 1 is an exemplary perspective view of an appearance of a notebook computer 10 serving as an example of an image processing apparatus according to an embodiment. The computer 10 includes a computer main body 11, and a display unit 12. A liquid crystal display (LCD) 17 is integrated into the display unit 12. The display unit 12 is attached to the computer main body 11 such that the display unit 12 is rotatable between an opened position in which an upper surface of the computer main body 11 is exposed and a closed position in which the display unit 12 covers the upper surface of the computer main body 11.

The computer main body 11 includes a housing of a thin box shape. A keyboard 13, a power button 14 to turn on/off the power of the computer 10, an input operation panel 15, a touchpad 16, and speakers 18A and 18B are arranged on the upper surface of the computer main body 11. Various operation buttons are provided on the input operation panel 15.

Figure 2:
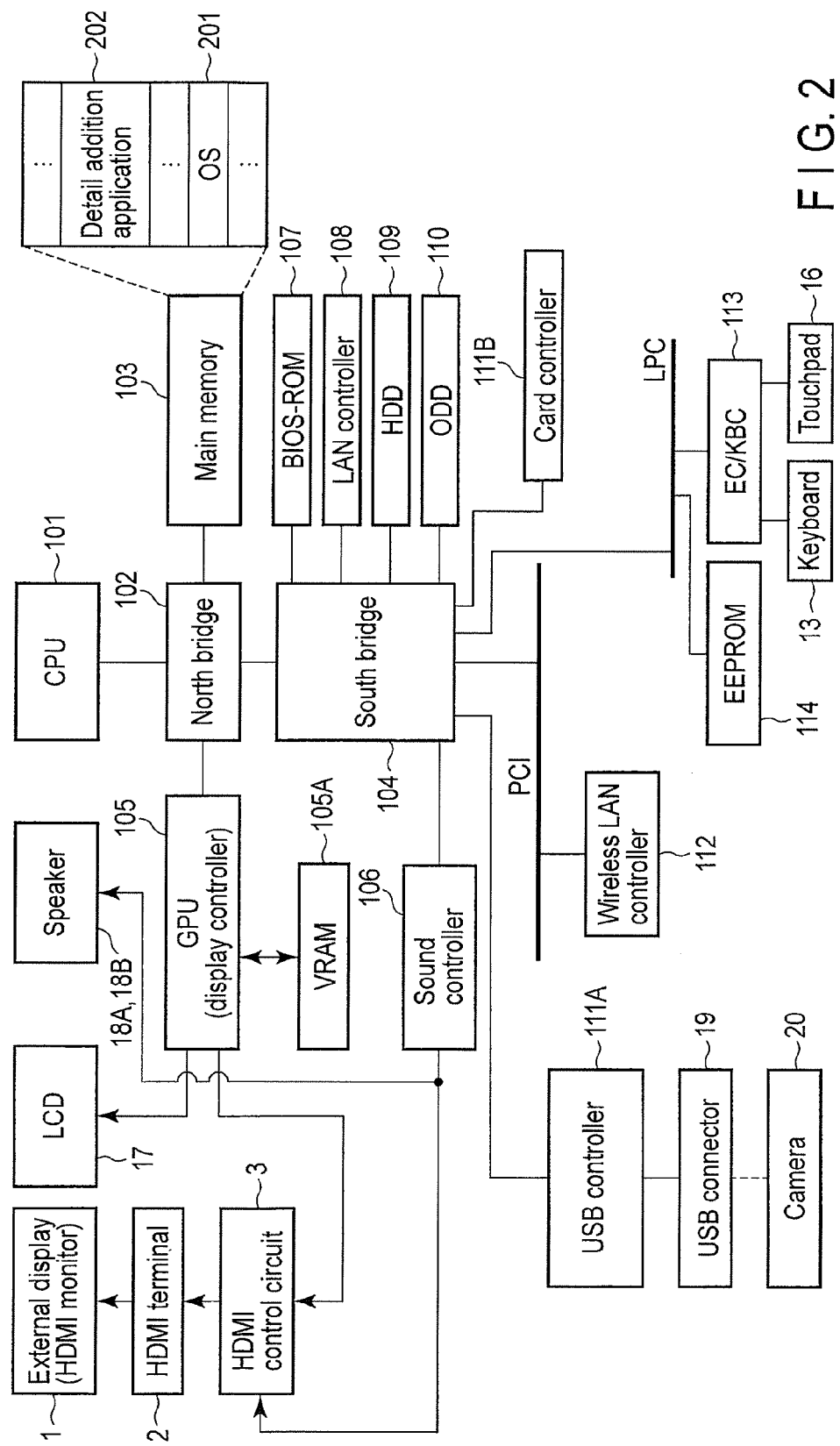
FIG. 2 is an exemplary block diagram of a system configuration of the image processing apparatus according to the embodiment.

A right-side surface of the computer main body 11 is provided with a connector to connect an external device, for example, a Universal Serial Bus (USB) connector 19 to connect a USB cable or a USB device conformant to the USB 2.0 standard. As illustrated in FIG. 2, an imaging device such as a digital camera 20 and a video camera is connected to the USB connector 19. A back surface of the computer main body 11 is also provided with a connector to connect an external device, such as an external display connecting terminal (not shown) which is conformant to the High-Definition Multimedia Interface (HDMI) standard. The external display connecting terminal is used for outputting digital image signals to an external display.

FIG. 2 is an exemplary diagram illustrating a system configuration of the computer 10. The computer 10 comprises a central processing unit (CPU) 101, a north bridge 102, a main memory 103, a south bridge 104, a graphics processing unit (GPU display controller) 105, a video RAM (random access memory) 105A, a sound controller 106, a Basic Input/Output System read-only memory (BIOS-ROM) 107, a local area network (LAN) controller 108, a hard disk drive (HDD) 109, an optical disk drive (ODD) 110, a USB controller 111A, a card controller 111B, a wireless LAN controller 112, an embedded controller/keyboard controller (EC/KBC) 113, an electrically erasable programmable ROM (EEPROM) 114, and the like.

The CPU 101 is a processor which controls operation of modules in the computer 10. The CPU 101 executes an operating system (OS) 201, and various application programs, such as a detail addition application program 202, which are loaded from the HDD 109 into the main memory 103. The detail addition application program 202 is a software which provides image data with perspective when various image data such as still images and moving images stored in the HDD 109 or the like is reproduced, and displays the processed image data on the LCD 17. The CPU 101 also executes a BIOS which is stored in the BIOS-ROM 107. The BIOS is a program for controlling a hardware.

The north bridge 102 is a bridge device which connects a local bus of the CPU 101 with the south bridge 104. The north bridge 102 also includes a memory controller which controls access to the main memory 103. The north bridge 102 also has a function of performing communication with the GPU 105 through a serial bus conformant to, for example, the PCI EXPRESS standard.

The GPU 105 is a display controller which controls the LCD 17 that is used as a display monitor of the computer 10.

A display signal which is generated by the GPU 105 is transmitted to the LCD 17. The GPU 105 can transmit a digital image (moving image, still image) signal to an external display 1 through an HDMI control circuit 3 and an HDMI terminal 2.

The HDMI terminal 2 is the external display connecting terminal described above. The HDMI terminal 2 can transmit a digital image signal and a digital audio signal, which are not compressed, to the external display 1 such as a television, by a cable. The HDMI control circuit 3 is an interface configured to transmit a digital image signal to the external display 1 referred to as an HDMI monitor through the HDMI terminal 2.

The south bridge 104 controls devices on a Peripheral Component Interconnect (PCI) bus and devices on a Low Pin Count (LPC) bus. The south bridge 104 includes an Integrated Drive Electronics (IDE) controller configured to control the HDD 109 and the ODD 110. The south bridge 104 also has a function of performing communication with the sound controller 106.

The sound controller 106 is a sound source device, and outputs audio data to be reproduced to the speakers 18A and 18B or the HDMI control circuit 3. The LAN controller 108 is a wired communication device which performs wired communication conformant to, for example, the IEEE 802.3 standard. The wireless LAN controller 112 is a wireless communication device which performs wireless communication conformant to, for example, the IEEE 802.11g standard. The computer 10 is connected to the Internet by the LAN controller 108 or the wireless LAN controller 112. The USB controller 111A performs communication with an external device, which is connected through the USB connector 19 and conformant to, for example, the USB 2.0 standard. For example, the USB controller 111A is used for receiving an image data file which is stored in the digital camera 20. The card controller 111B performs writing and reading of data for a memory card, such as an SD card, which is inserted into a card slot (not shown) that is provided in the computer main body 11.

The EC/KBC 113 is a single-chip microcomputer which is obtained by integrating an embedded controller for electric power control with a keyboard controller configured to control the keyboard 13 and the touchpad 16. The EC/KBC 113 has a function of turning on/off the power of the computer 10, in response to operation of the power button 14 by the user.

Figure 3:
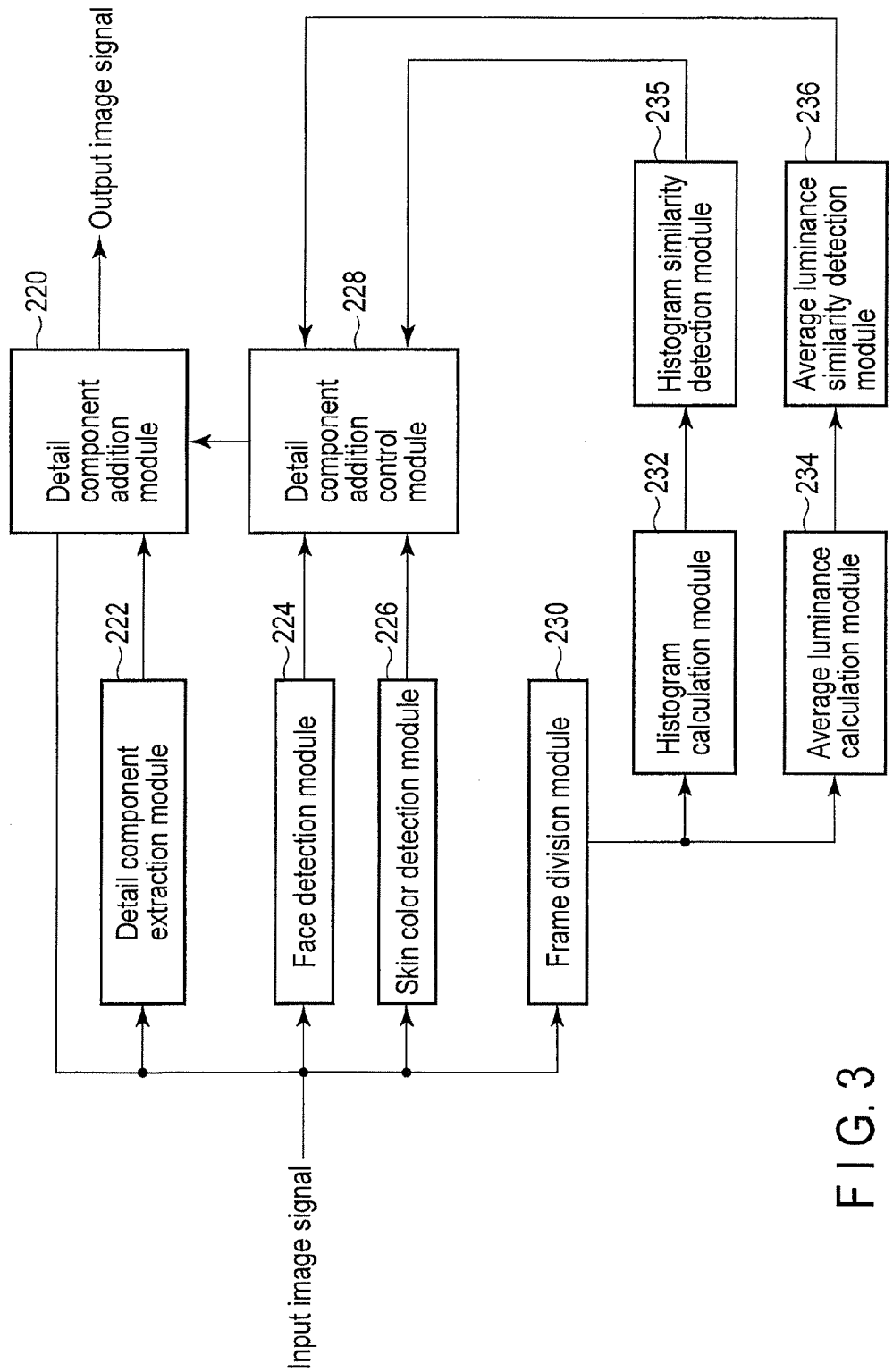
FIG. 3 is an exemplary block diagram of a functional structure of a program of a detail addition application according to the embodiment.

FIG. 3 is an exemplary block diagram illustrating a functional structure of the detail addition application program 202.

Images which are input from the camera 20, or downloaded from the Internet by the LAN controller 108 or the wireless LAN controller 112, are stored in the HDD 109. The detail addition application program 202 processes an image of each frame and provide the image with perspective, and is equally applicable to still images and moving images. The simple term "image" in the following explanation indicates both a still image and a moving image.

An image signal which is read from the HDD 109 is input to a detail component addition module 220, a detail component extraction module 222, a face detection module 224, a skin color detection module 226, and a frame division module 230.

The detail component extraction module 222 extracts a detail component of the input image, and supplies the detail component to the detail component addition module 220. The detail component extraction module 220 detects edges of the image by using, for example, a Laplacian filter. The face detection module 224 detects face regions from the input image, and supplies region information which indicates coordinates of the detected face regions to a detail component addition control module 228. The method of detecting face regions is not limited, and any known method can be used. The skin color detection module 226 detects skin color regions from the input images, and supplies region information of the detected skin color regions to the detail component addition control module 228. The method of detecting skin color regions is not limited, either, and any known method can be used.

The frame division module 230 divides the input image (one frame) into small regions of a predetermined number (for example, 8×8), and supplies image information of each small region to a histogram calculation module 232, and an average luminance calculation module 234. The histogram calculation module 232 calculates a histogram of the image signal for each small region, and supplies the calculated histogram for each small region to a histogram similarity detection module 235. The histogram similarity detection module 235 determines whether there are small regions, histograms of which are similar to each other (a difference between the histograms is a predetermined value or less), and supplies the region information items of the small regions which have the similar histograms to the detail component addition control module 228. The average luminance calculation module 234 calculates an average luminance of the image signal for each small region, and supplies the calculated average luminance of each small region to an average luminance similarity detection module 236. The average luminance similarity detection module 236 determines whether there are small regions which have similar average luminances (a difference between the average luminance is a predetermined value or less), and supplies the region information items of the small regions which have the similar average luminances to the detail component addition control module 228.

The detail component addition control module 228 supplies an addition control signal to the detail component addition module 220, to control an addition quantity of a detail component in one frame according to the place, or unify an addition quantity of the detail component to the whole picture, in accordance with the face region information supplied from the face detection module 224, the skin color region information supplied from the skin color detection module 226, the information of the small regions, which have similar histograms, that is supplied from the histogram similarity detection module 235, and the information of the small regions, which have similar average luminances, that is supplied from the average luminance similarity detection module 236. The detail component addition module 220 adds a detail component that is supplied from the detail component detection module 222 to the input image signal. The addition quantity of the detail component is varied (attenuated), in accordance with the addition control signal which is supplied from the detail component addition control module 228. The detail component addition control module 228 outputs an image signal obtained by adding the detail component to the input signal. The output signal is displayed on the LCD 17 or the external display 1.

Figure 4:
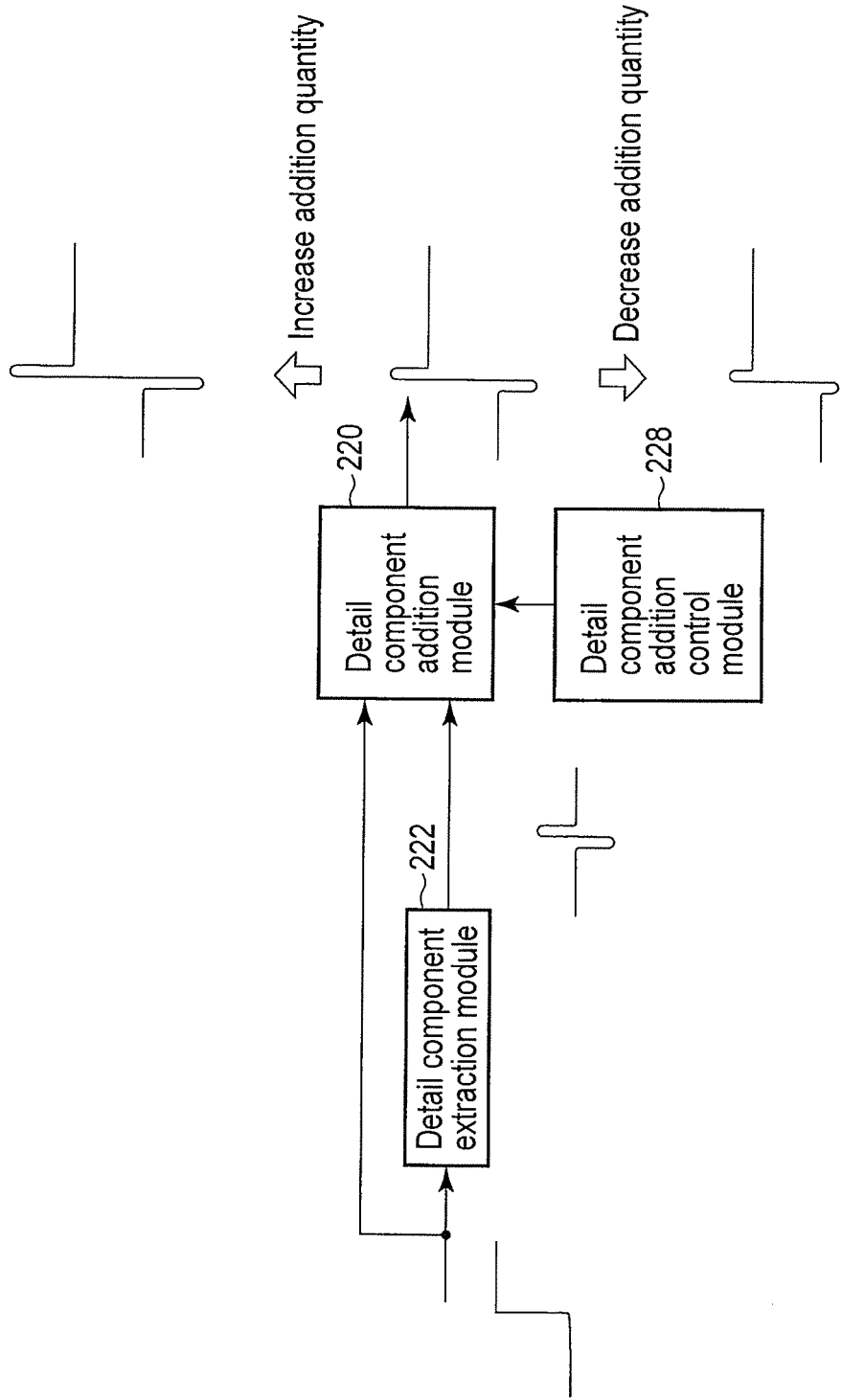
FIG. 4 is an exemplary diagram illustrating a functional structure of a main part of the detail addition application according to the embodiment.

FIG. 4 is an exemplary diagram illustrating an operation principle of the detail component addition module 220. The detail component detection module 222 subjects the input image signal to sharpening filtering, and emphasizes parts (outlines, edges) in which a density value changes in the image. A Laplacian filter which performs quadratic differentiation can be used as the sharpening filter. For example, an example of coefficients of a 3×3 Laplacian filter is as follows:

−1, −1, −1
−1, 8, −1
−1, −1, −1

The detail component detection module 222 outputs a detail component to emphasize parts, in which the density value changes, of the input image signal. The detail component is added to the input signal by the detail component addition module 220, and thereby an image signal with emphasized outlines and/or edges is obtained.

The detail component addition control module 228 supplies an addition control signal to variably control the addition quantity in accordance with the place in the picture to the detail component addition module 220. When the detail component which is extracted by the detail component extraction module 220 is uniformly added to the image signal, no perspective is generated although outlines and/or edges in the whole image are emphasized. To provide the image with perspective, it is necessary to emphasize outlines and/or edges of subjects located at a short distance in the image, and decrease the emphasis degree of subjects located at a long distance in the image. When the addition quantity of the detail component increases, the emphasis degree of edges and/or outlines increases. When the addition quantity decreases, the emphasis degree of edges decreases. Therefore, in the present embodiment, the addition quantity of the detail component is changed in accordance with the distance of each place in the picture, and thus the detail component addition module 220 varies the addition quantity of the detail component in accordance with the distance of each place in the picture.

An example of variation (gradation processing) of detail component addition which gives perspective is detecting a vanishing point by analyzing composition of the image, and gradually attenuating the detail addition quantity toward the vanishing point. Thereby, edges and outlines which are located far from the vanishing point are strongly emphasized, the emphasis degree gradually decreases toward the vanishing point, and thereby the image is provided with perspective. Various known composition analysis methods can be used as composition analysis for detecting the vanishing point.

When the composition cannot be analyzed, the following estimation is performed in the present embodiment. In composition of an ordinary image, the lower part of the picture is usually the ground and a short-distance subject, and the upper part of the picture is usually the sky and a long-distance subject. It can be estimated that the lower end of the picture is closest, the upper end of the picture is most distant, and the distance gradually increases from the lower end to the upper end. Therefore, the detail component addition control module 228 supplies an addition control signal which attenuates the addition quantity of the detail component from the lower end toward the upper end of the picture to the detail component addition module 220. Thereby, the detail component addition module 220 adds the detail component to the image signal, such that the addition quantity decreases from the lower end toward the upper end. Thereby, the emphasis degree of the edges gradually changes (gradation processing) in accordance with the distance, edges of closer subjects are more emphasized, and perspective is emphasized. The above is a principle of emphasis, and the following exceptional processing is performed.

(i) Gradation processing is turned off in face regions.
(ii) Gradation processing is turned off in skin color regions.
(iii) Gradation processing is turned off in regions which have similar histograms.
(iv) Gradation processing is turned off in regions which have similar average luminances.

The regions of (i) and (ii) can be estimated as having the same distance. The regions of (iii) and (iv) are the background, and also can be estimated as having the same distance. Therefore, when the addition quantity of the detail component is varied in these regions, the image is provided with unnatural perspective. Thus, in the present embodiment, attenuation of the addition quantity (gradation processing) is not performed in these regions, and a fixed quantity of the detected detail component is added to the regions. In other words, although the degree of emphasis of edges and outlines decreases from the lower end toward the upper end of the picture in principle, the degree of emphasis of edges and outlines is not decreased in the regions of (i) to (iv).

(v) Gradation processing of the whole picture is turned off if the rate of face regions for the whole picture is greater than or equal to a predetermined value.
(vi) Gradation processing of the whole picture is turned off if the rate of skin color regions for the whole picture is greater than or equal to predetermined value.
(vii) Gradation processing of the whole picture is turned off if the number of regions which have similar histograms is larger than a predetermined number.
(viii) Gradation processing of the whole picture is turned off when the number of regions which have similar average luminances is larger than a predetermined number.

In the case of items (v) to (viii), it can be estimated that the whole picture is flat (equal distance), and thus performing attenuation of the addition quantity (gradation processing) generates an unnatural image. Therefore, a fixed quantity of the detected detail component is uniformly added to the image, and thus edges and outlines are uniformly emphasized in the whole picture.

Figure 5:
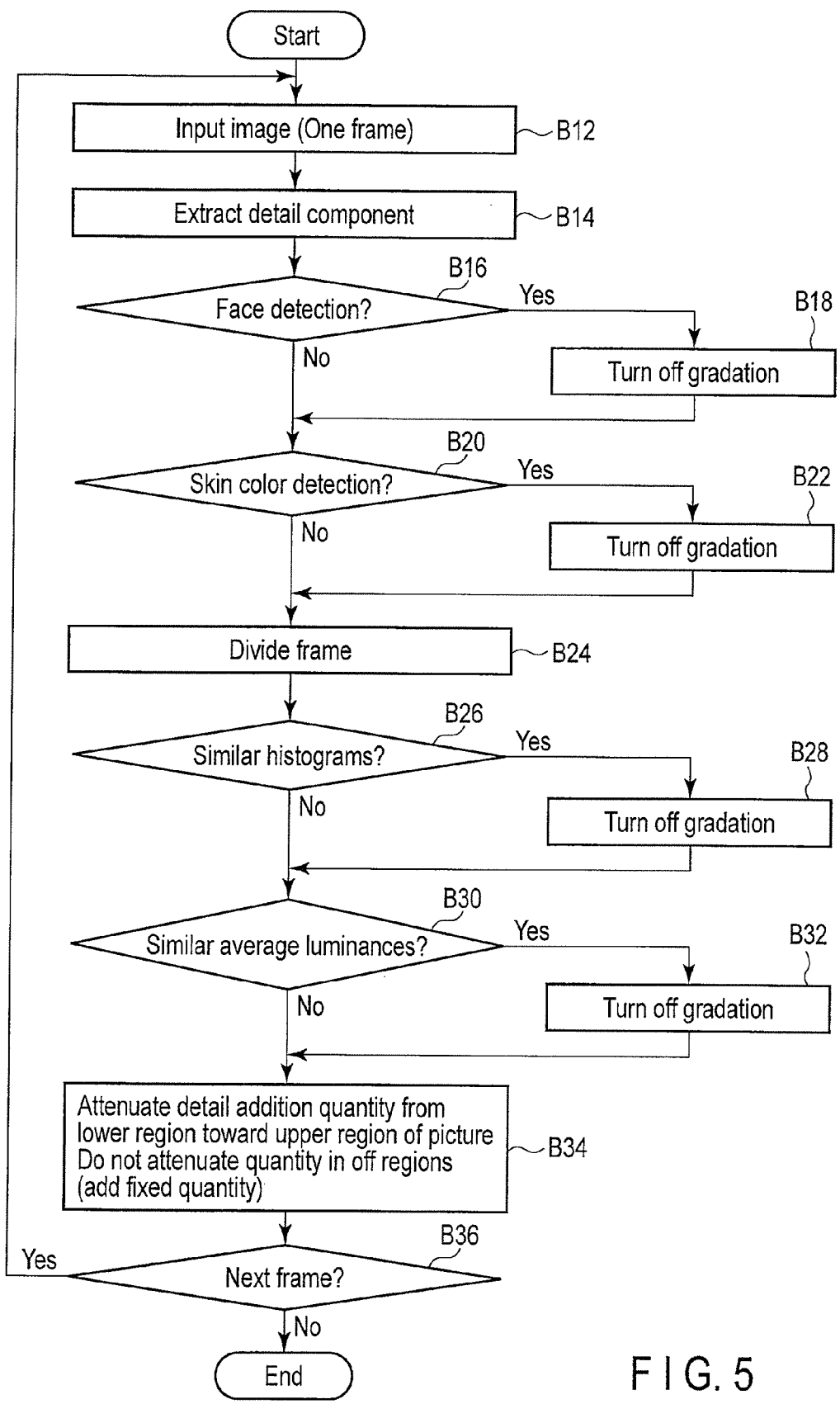
FIG. 5 is an exemplary flowchart illustrating operation of the image processing apparatus according to the embodiment.

FIG. 5 is an exemplary flowchart illustrating operation of the detail addition processing according to the embodiment. In block B12, an image signal of one frame is read from, for example, the HDD 109 or input from the camera 20, and input to the detail component extraction module 222, the face detection module 224, the skin color detection module 226, and the frame division module 230. In block B14, the detail component extraction module 222 extracts a detail component of the input image, and supplies the detail component to the detail component addition module 220.

In block B16, the face detection module 224 detects face regions from the input image, and supplies information of the detected face regions to the detail component addition control module 228. In block B18, the detail component addition control module 228 turns off gradation processing for the face regions. Although not illustrated, gradation processing for the whole picture is turned off when the rate of the face regions for the whole picture is greater than or equal to a predetermined value.

In block B20, the skin color detection module 226 detects skin color regions from the input image, and supplies information of the detected skin color regions to the detail component addition control module 228. In block B22, the detail component addition control module 228 turns off gradation processing for the skin color regions. Although not illustrated, gradation processing for the whole picture is turned off when the rate of the skin color regions for the whole picture is greater than or equal to a predetermined value.

In block B24, the frame division module 230 divides the input image (one frame) into a predetermined number (for example, 8×8) of small regions. In block B26, the histogram similarity detection module 235 determines whether there are small regions which have similar histograms or not, and supplies information of the small regions which have similar histograms to the detail component addition control module 228. In block B28, the detail component addition control module 228 turns off gradation processing for the small regions which have similar histograms. Although not illustrated, gradation processing for the whole picture is turned off when the number of small regions which have similar histograms is larger than a predetermined number.

In block B30, the average similarity detection module 236 determines whether there are small regions which have similar average luminances or not, and supplies information of the small regions which have similar average luminances to the detail component addition control module 228. In block B32, the detail component addition control module 228 turns off gradation processing of the small regions which have similar average luminances. Although not illustrated, gradation processing for the whole picture is turned off when the number of small regions which have similar average luminances is larger than a predetermined number.

In block B34, although the detail component addition module 220 adds the detail component to the input image signal, the quantity of the detail component to be added is attenuated from the lower end toward the upper end of the picture. For example, although 100% of the extracted detail component is added to the lower end of the picture, 50% of the extracted detail component is added to the center part of the picture, and no detail component is added to the upper end. Thereby, the added detail quantity is attenuated. Thereby, edges are more emphasized toward the lower end of the picture, the emphasis degree of edges decreases toward the upper end of the picture (gradation processing of the detail component addition), and thereby perspective of the image is emphasized. The detail quantity to be added may be uniformly (linearly) attenuated from the lower end toward the upper end of the picture, or may be changed in a functional (curve) manner, or a stepped manner. In addition, although the addition detail quantity is varied by attenuation in the present embodiment, the method of variation is not limited to attenuation. For example, the extracted detail quantity may be amplified in the lower half region of the picture, and the extracted detail quantity may be attenuated in the upper half region of the picture.

Change of the added detail quantity (gradation processing) is controlled by the detail addition control module 228. The detail addition control module 228 performs no gradation processing in the face regions, skin color regions, regions which have similar histograms, and regions which have similar average luminances, but adds a fixed quantity of detail component to the regions. When the number of the regions which have similar histograms or the number of regions which have similar average luminances is larger than the predetermined number, the detail addition control module 228 performs processing such that a fixed amount of detail quantity is added to the whole picture. No limitations are placed on the detail component added to these regions, as long as the detail component has a fixed quantity. For example, the quantity of the detail component may be an attenuation quantity in the starting position of the face region, an attenuation quantity in the end position of the face region, an average attenuation quantity of them, or an attenuation quantity of a predetermined rate (50%).

In block B36, it is determined whether there is next frame to be processed or not. The processing returns to block B12 when there is a next frame to be processed, and the processing is finished when there is no next frame to be processed.

FIG. 6A is an example of the image signal. In FIG. 6A, a person is located in a road, which is located in the center of the picture and extends from the front toward the back of the picture, and there is a landscape on both sides of the road. In this case, the distance to the subject changes from short distance to long distance from the lower end toward the upper end of the picture in the left part I and the right part III of the picture, and thus the detail addition quantity gradually decreases from the lower end toward the upper end of the picture, as illustrated in FIG. 6B. Therefore, edges are more emphasized in parts close to the lower end of the picture, the emphasis degree of edges is attenuated in parts close to the upper end, and thereby natural perspective is generated. Since the center part II of the picture includes a face region of a person, the detail addition quantity gradually decreases from the lower end toward the upper end of the picture, and a fixed quantity of the detail component is added to the face region, as illustrated in FIG. 6C. Therefore, perspective is generated only in parts other than the face region, and fixed edge emphasis is performed for the face region.

As described above, according to the present embodiment, the detail component is added to the image, the detail addition quantity is varied according to the distance, and thereby the emphasis degree of outlines can be varied in accordance with the distance, and the image is provided with perspective. In addition, regions which do not need variation of the addition quantity (gradation processing) are detected, no gradation processing is performed in the detected regions, but a fixed quantity of the detail component is added to the detected regions.

The present invention is not limited to the above embodiment without any change, but can be carried out by modifying the constituent elements within a range not departing from the gist of the invention. In addition, various inventions can be made by proper combinations of constituent elements disclosed in the above embodiment. For example, some constituent elements may be deleted from all the constituent elements disclosed in the embodiment. Besides, constituent elements of different embodiments may be used in combination.

Although the embodiment is explained with an example of a notebook computer, the embodiment is not limited to it, but is applicable to any devices and products, as long as it reproduces and displays images. The embodiment is applicable to both still images and moving images. Detection of the detail component is not limited to processing using a Laplacian filter, but other edge/outline emphasizing processing may be used. The regions, for which gradation processing of detail component addition is not performed, are not limited to the above four types of regions, but may be changed as desired. For example, it is not indispensable to provide both the face detection module 224 and the skin color detection module 226, but only one of the modules may be provided. In addition, it is not indispensable to provide both the histogram calculation module 232 and the average luminance calculation module 234, but only one of the modules may be provided. Further, the detail component addition procedure may be performed by a hardware system, not by a software program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   one or more processors; and
   a memory storing one or more modules that, when executed by the one or more processors, detect a detail component of an image signal, adds the detected detailed component to the image signal of a frame, decrease an addition quantity of the detected detail component to the image signal from a lower end of the frame toward an upper end of the frame, and detect a face region or a skin color region in the one frame;
   wherein the decreasing of the addition quantity is stopped in the face region or the skin color region, and a fixed quantity of the detail component is added to the face region or the skin color region
   a detail component an image signal of one frame.

2. The apparatus of claim 1, wherein upon execution by the one or more processors, the one or more modules further decrease the addition quantity of the detected detail component from a short-distance region toward a long-distance region in the frame.

3. The apparatus of claim 1, wherein upon execution by the one or more processors, the one or more modules
   add a fixed quantity of the detail component for a whole frame, if a rate of the face region or the skin color region in the image signal is greater than a determined value.

4. The apparatus of claim 1, wherein upon execution by the one or more processors, the one or more modules further
   calculate respective histograms of small regions of the image signal, and
   add a fixed quantity of the detail component for small regions in which a difference between the histograms is less than a predetermined value.

5. The apparatus of claim 1, wherein upon execution by the one or more processors, the one or more modules further
   calculate respective histograms of small regions of the image signal, and
   add a fixed quantity of the detail component for a whole frame, when small regions in which a difference of the histograms is less than a predetermined value exceed in number a predetermined number.

6. The apparatus of claim 1, wherein upon execution by the one or more processors, the one or more modules
   calculate respective average luminances of small regions of the image signal, and
   add a fixed quantity of the detail component for small regions in which a difference between the average luminances is less a predetermined value.

7. The apparatus of claim 1, wherein upon execution by the one or more processors, the one or more modules
   calculate respective average luminances of small regions of the image signal, and
   add a fixed quantity of the detail component for a whole frame, when small regions in which a difference of the average luminances is less than a predetermined value exceed in number a predetermined number.

8. The apparatus of claim 1, wherein
   the detail component of the image signal is detected by a Laplacian filter to process the image signal.

9. A computer-implemented method comprising:
   detecting, through one or more processors, a detail component of an image signal of one frame;
   adding, through one or more processors, the detected detail component to the image signal;
   decreasing, through one or more processors, an addition quantity of the detected detail component to the image signal from a lower end of the one frame toward an upper end of the one frame;
   detecting, through one or more processors, a face region or a skin color region in the one frame;
   wherein the decreasing of the addition quantity is stopped in the face region or the skin color region, and a fixed quantity of the detail component is added to the face region or the skin color region.

10. A non-transitory computer-readable storage medium storing computer-executable instructions that, when executed, cause a computer to:
    detect a detail component of an image signal of one frame;
    add, through one or more processors, the detected detail component to the image signal;
    decrease, through one or more processors, an addition quantity of the detected detail component to the image signal from a lower end of the one frame toward an upper end of the one frame; and
    detect, through one or more processors, a face region or a skin color region in the one frame;
    wherein the decreasing of the addition quantity is stopped in the face region or the skin color region, and a fixed quantity of the detail component is added to the face region or the skin color region.

11. The method of claim 9, further comprising:
    decreasing the addition quantity of the detected detail component from a short-distance region toward a long-distance region in the frame.

12. The method of claim 9, further comprising:
    adding a fixed quantity of the detail component for a whole frame, if a rate of the face region or the skin color region in the image signal is greater than a determined value.

13. The method of claim 9, further comprising:
    calculating respective histograms of small regions of the image signal, and
    adding a fixed quantity of the detail component for small regions in which a difference between the histograms is less than a predetermined value.

14. The method of claim 9, further comprising:
    calculating respective histograms of small regions of the image signal, and
    adding a fixed quantity of the detail component for a whole frame, when small regions in which a difference of the histograms is less than a predetermined value exceed in number a predetermined number.

15. The method of claim 9, further comprising:
    calculating respective average luminances of small regions of the image signal, and
    adding a fixed quantity of the detail component for small regions in which a difference between the average luminances is less a predetermined value.

16. The method of claim 9, further comprising:
    calculating respective average luminances of small regions of the image signal, and
    adding a fixed quantity of the detail component for a whole frame, when small regions in which a difference of the average luminances is less than a predetermined value exceed in number a predetermined number.

17. The method of claim 9, wherein
    the detail component of the image signal is detected by a Laplacian filter to process the image signal.

18. The storage medium of claim 10 including the instructions that, when executed, further cause the computer to:

decrease the addition quantity of the detected detail component from a short-distance region toward a long-distance region in the frame.

19. The storage medium of claim 10 including the instructions that, when executed, further cause the computer to:
add a fixed quantity of the detail component for a whole frame, if a rate of the face region or the skin color region in the image signal is greater than a determined value.

20. The storage medium of claim 10 including the instructions that, when executed, further cause the computer to:
calculate respective histograms of small regions of the image signal, and
add a fixed quantity of the detail component for small regions in which a difference between the histograms is less than a predetermined value.

* * * * *